(12) United States Patent
Wronski

(10) Patent No.: US 7,922,020 B2
(45) Date of Patent: Apr. 12, 2011

(54) APPARATUS FOR SECURING A LINE SUCH AS A CABLE

(75) Inventor: Grzegorz Wronski, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 929 days.

(21) Appl. No.: 11/430,493

(22) Filed: May 9, 2006

(65) Prior Publication Data

US 2007/0261881 A1 Nov. 15, 2007

(51) Int. Cl.
*H02G 3/08* (2006.01)
(52) U.S. Cl. ............... 220/3.2; 220/4.02; 248/56
(58) Field of Classification Search ........... 220/254.7, 220/3.3, 3.4, 3.5, 3.6, 3.7, 4.02, 3.2, 254.3; 16/108, 2.2, 2.1; 174/666, 153 G, 650, 659; 248/56, 73
See application file for complete search history.

(56) References Cited

U.S. PATENT DOCUMENTS

| | | |
|---|---|---|
| 3,104,087 A | 9/1963 | Budnick et al. |
| 3,123,662 A | 3/1964 | Fink |
| 3,424,856 A | 1/1969 | Coldren |
| 3,493,205 A | 2/1970 | Bromberg |
| 3,562,847 A | 2/1971 | Jemison |
| 3,564,113 A | 2/1971 | Kindler |
| 3,991,446 A | 11/1976 | Mooney et al. |
| 4,000,875 A | 1/1977 | Jemison et al. |
| 4,056,252 A * | 11/1977 | Simon ............ 248/56 |
| 4,142,064 A | 2/1979 | Thomsen |
| 4,167,648 A | 9/1979 | Lockwood |
| 4,188,003 A | 2/1980 | Ramsey |
| 4,190,222 A | 2/1980 | Appleton et al. |
| 4,262,409 A | 4/1981 | Madej |
| 4,269,378 A | 5/1981 | Barry |
| 4,299,363 A | 11/1981 | Datschefski |
| 4,350,839 A | 9/1982 | Lass |
| 4,361,302 A | 11/1982 | Lass |
| 4,366,343 A | 12/1982 | Slater et al. |
| 4,388,677 A | 6/1983 | Druffel |
| 4,474,489 A | 10/1984 | Simon |
| 4,511,113 A | 4/1985 | Druffel et al. |
| 4,678,146 A | 7/1987 | Plyler |
| 4,729,080 A | 3/1988 | Fremont et al. |
| 4,754,377 A | 6/1988 | Wenman |
| 4,757,967 A | 7/1988 | Delmore et al. |
| 4,829,410 A | 5/1989 | Patel |
| 4,919,370 A | 4/1990 | Martin et al. |
| 4,990,721 A | 2/1991 | Sheehan |
| 5,057,979 A | 10/1991 | Carson et al. |
| 5,073,845 A | 12/1991 | Aubrey |
| 5,075,831 A | 12/1991 | Stringer et al. |
| 5,118,057 A * | 6/1992 | Martin et al. ............ 248/56 |
| 5,167,047 A * | 12/1992 | Plumley ............ 174/153 G |
| 5,374,017 A | 12/1994 | Martin et al. |
| 5,374,812 A | 12/1994 | Chan et al. |
| 5,452,816 A | 9/1995 | Chan et al. |
| 5,581,448 A | 12/1996 | Harwood |
| 5,588,737 A | 12/1996 | Kusmer |
| 5,738,436 A | 4/1998 | Cummings et al. |
| 5,845,886 A | 12/1998 | McCormick |

(Continued)

*Primary Examiner* — Anthony Stashick
*Assistant Examiner* — Jeffrey Allen
(74) *Attorney, Agent, or Firm* — King & Spalding LLP

(57) ABSTRACT

An apparatus for securing a line such as, for example, a cable or the like, thereto is described. In an exemplary embodiment, the apparatus is coupled to an electrical box into which the cable extends.

10 Claims, 9 Drawing Sheets

U.S. PATENT DOCUMENTS

| | | |
|---|---|---|
| 5,957,573 A | 9/1999 | Wedekind et al. |
| 6,030,102 A | 2/2000 | Gromotka |
| 6,147,307 A | 11/2000 | Ling et al. |
| 6,211,465 B1 | 4/2001 | Streit |
| 6,248,952 B1 | 6/2001 | Reeves et al. |
| 6,254,041 B1 | 7/2001 | DuFourg |
| 6,278,061 B1 | 8/2001 | Daoud |
| 6,297,457 B1 | 10/2001 | Yamada et al. |
| 6,498,295 B1 | 12/2002 | Akiyama et al. |
| 6,527,406 B1 | 3/2003 | Slesinger et al. |
| 6,694,566 B1 * | 2/2004 | Mockett .......................... 16/2.1 |
| 2004/0069783 A1 * | 4/2004 | Chen .......................... 220/254.3 |

\* cited by examiner

APPARATUS FOR SECURING A LINE SUCH AS A CABLE

BACKGROUND

The present disclosure relates in general to securing lines such as, for example, cables or the like, and in particular to an apparatus for securing a cable or the like thereto. The apparatus may be coupled to, for example, an electrical box into which the cable extends.

DETAILED DESCRIPTION

Figure 1:
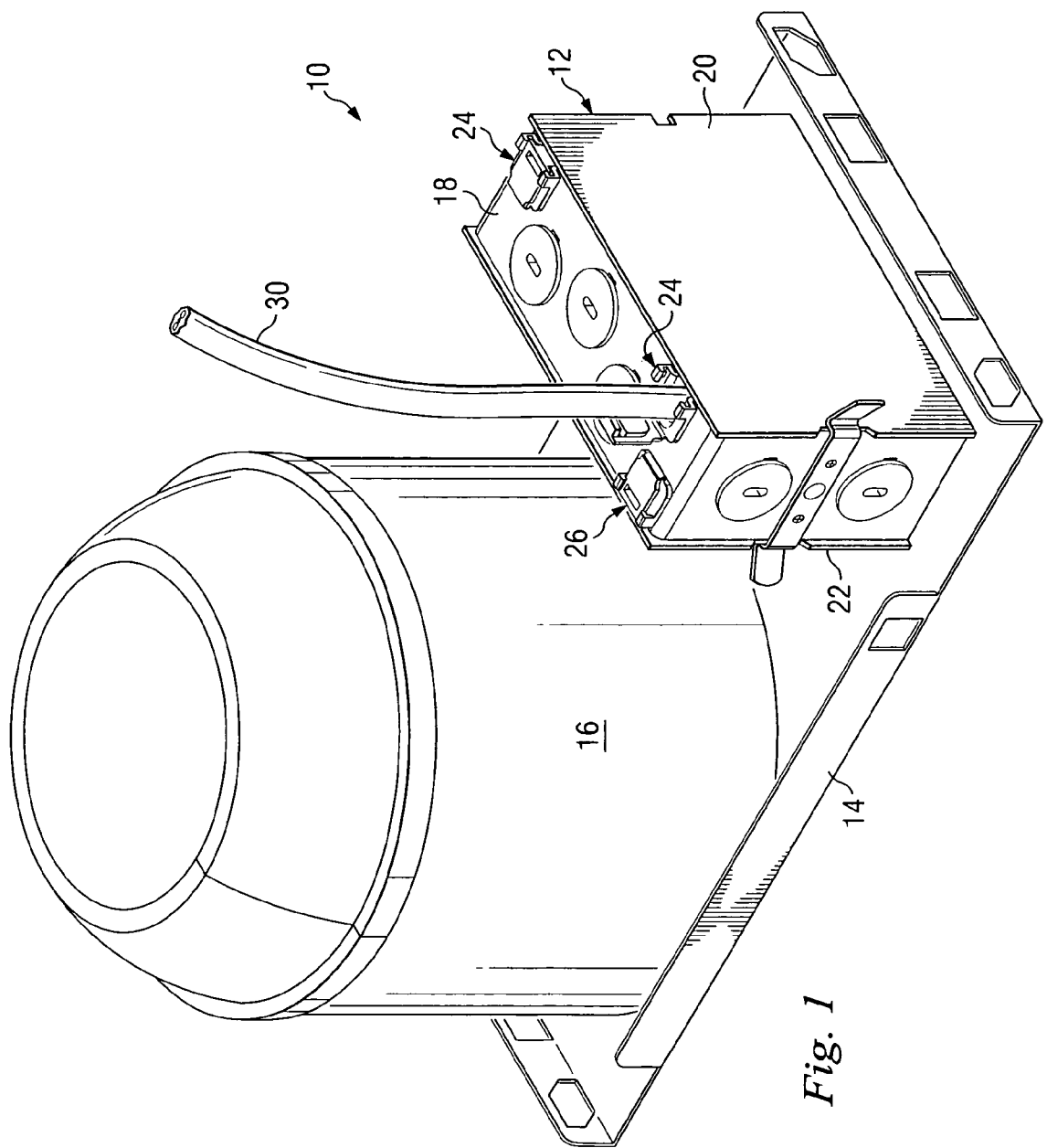
FIG. 1 is a perspective view of a recessed lighting fixture including a cable and an electrical box, to which traps, according to an embodiment of the present disclosure, are coupled.
Figure 2:
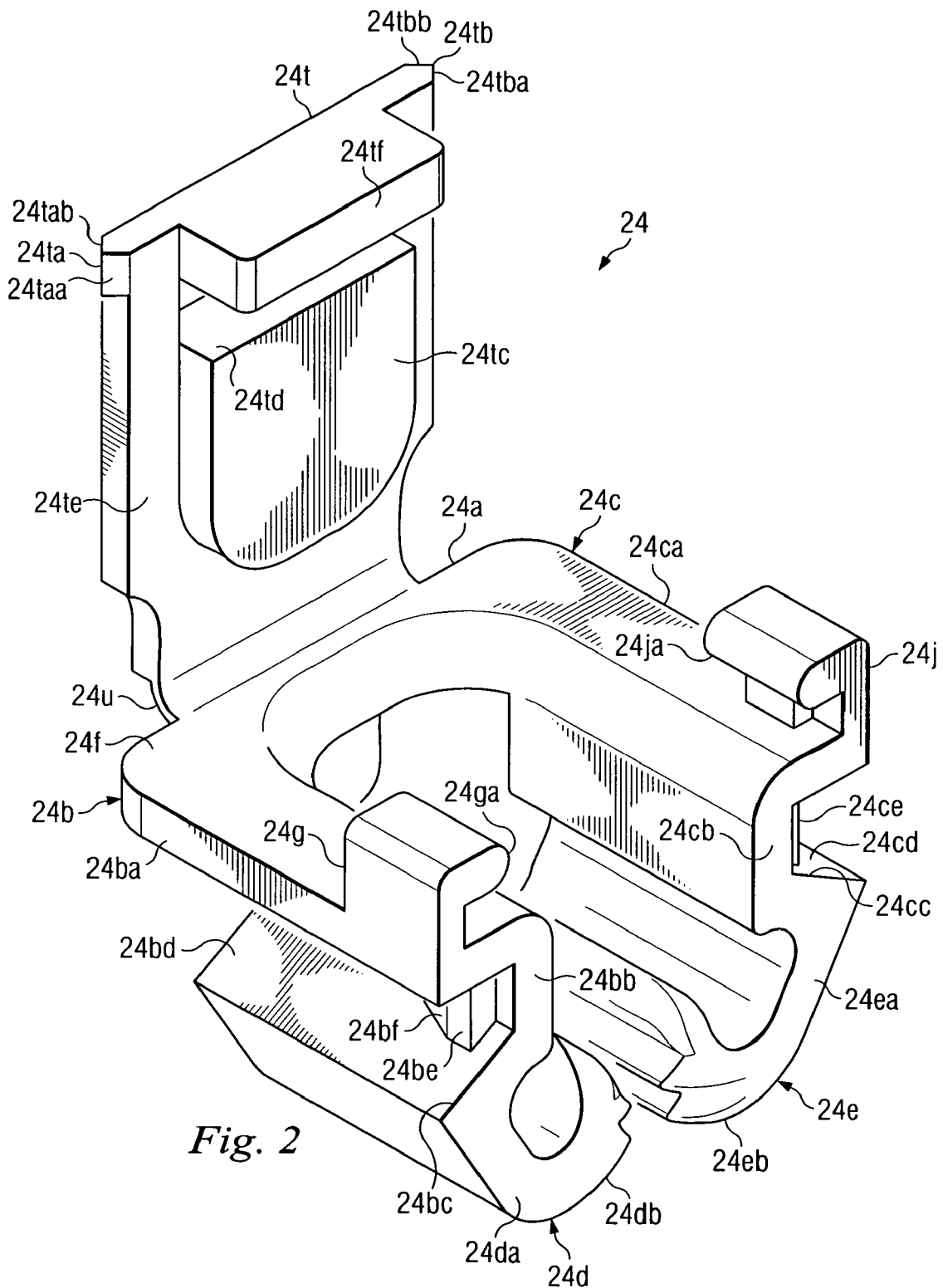
FIG. 2 is a perspective view of one of the traps depicted in FIG. 1.
Figure 4:
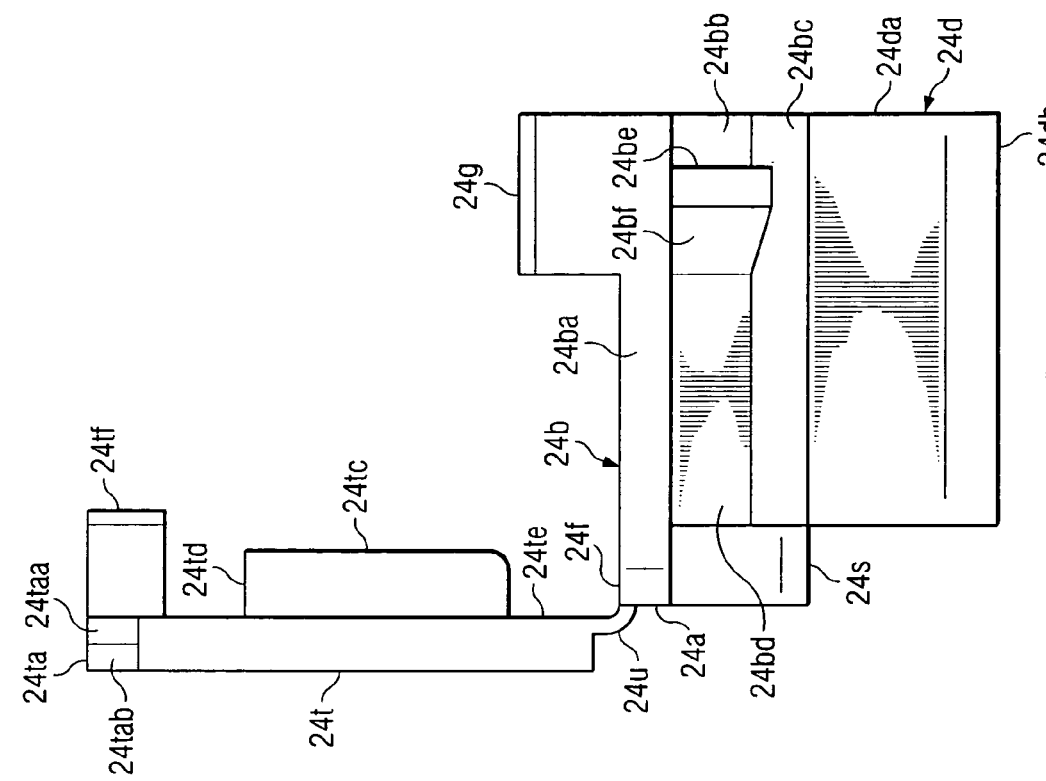
FIG. 4 is a left side elevational view of the trap of FIG. 2.
Figure 3:
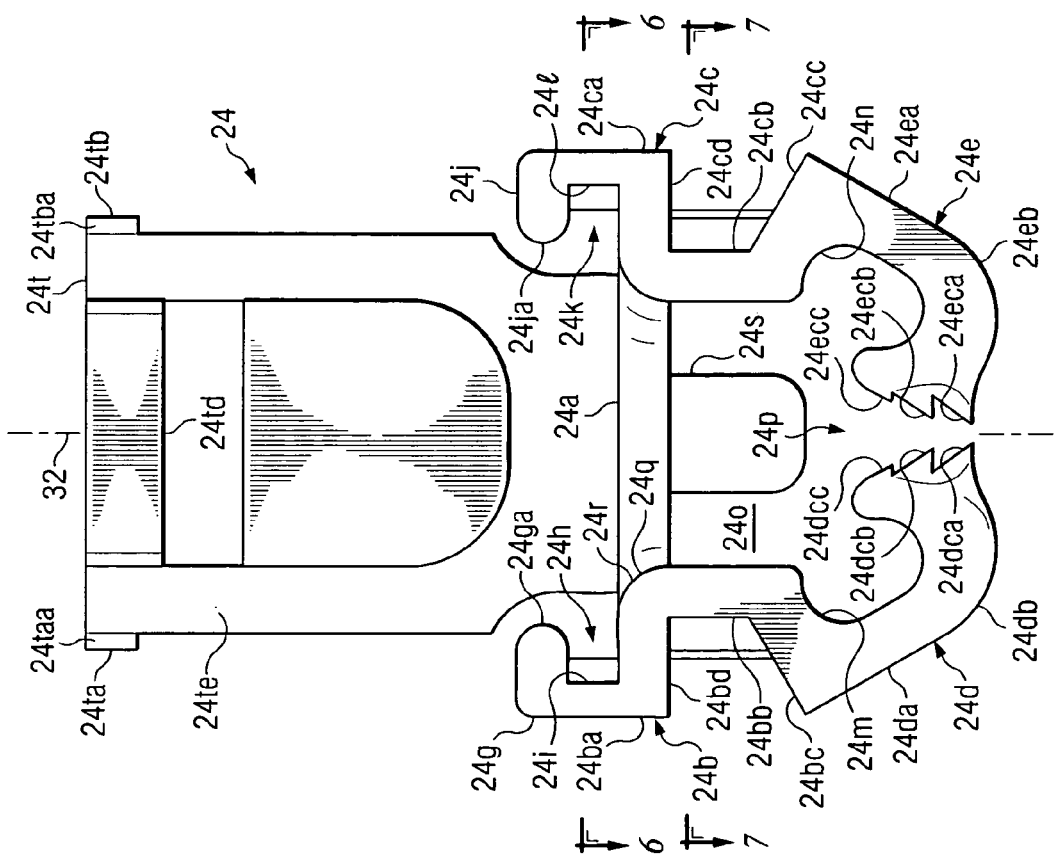
FIG. 3 is a front elevational view of the trap of FIG. 2.
Figure 5:
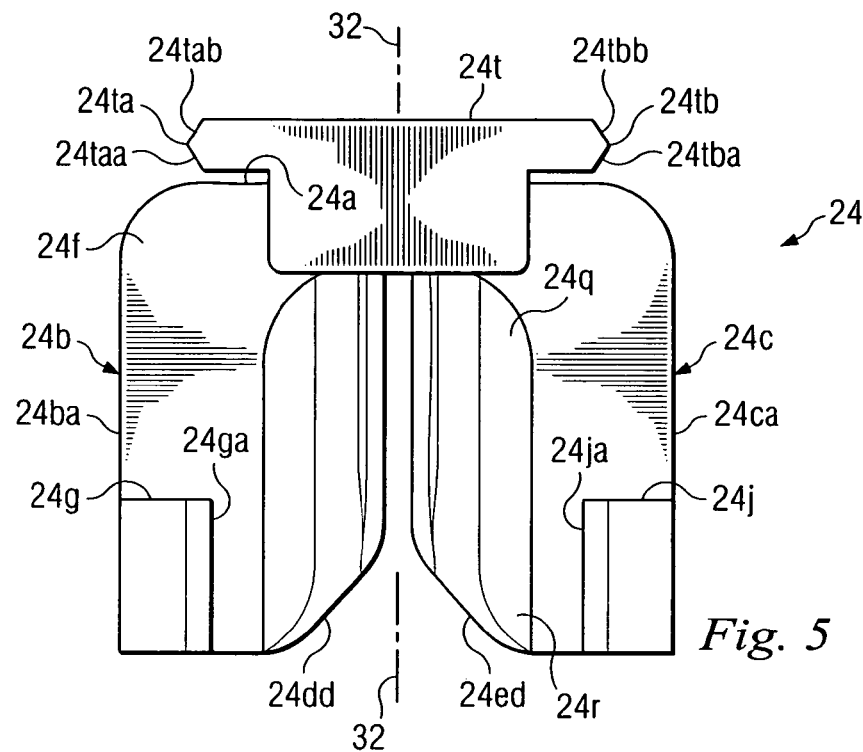
FIG. 5 is a top plan view of the trap of FIG. 2.
Figure 6:
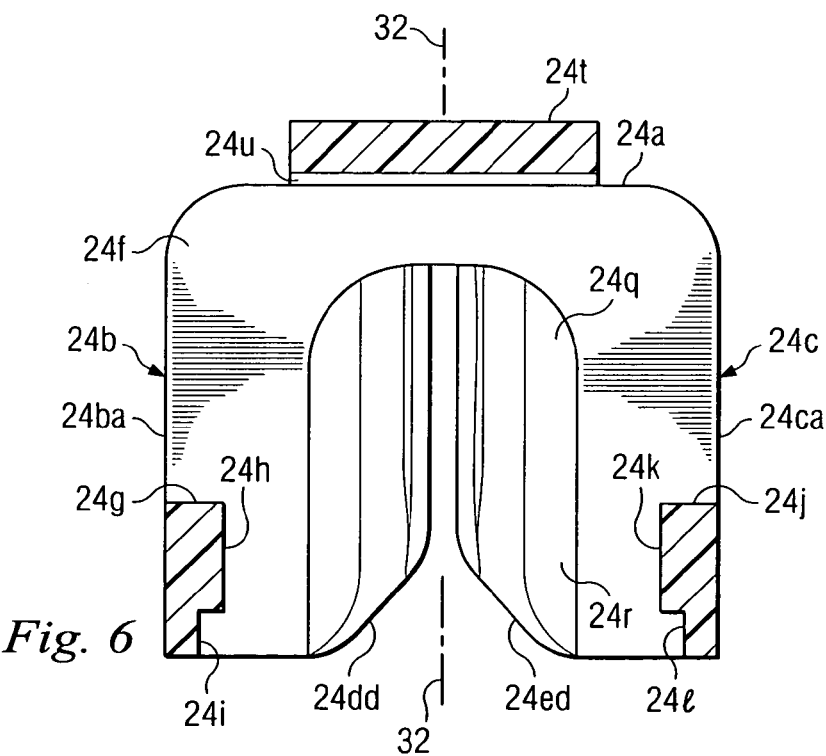
FIG. 6 is a sectional view of the trap of FIG. 3 taken along line 6-6.

In an exemplary embodiment, as illustrated in FIG. 1, a recessed luminaire or lighting fixture is referred to in general by the reference numeral 10 and includes a junction, or electrical, box 12 that is coupled to a frame, or plate, 14. A can, or housing, 16 is coupled to the plate 14. In an exemplary embodiment, a lamp and/or reflector is disposed in the housing 16 and one or more hanger bars are coupled to the plate 14 for coupling the lighting fixture 10 to a support structure such as, for example, one or more joists of a building. The electrical box 12 includes an upside-down-U-shaped bracket 18 and covers 20 and 22 coupled thereto. The bracket 18 is coupled to the plate 14.

Traps 24, 26 and 28 are coupled to the bracket 18, and may be placed in an open configuration or a closed configuration, in a manner and under conditions to be described below. A line, in the form of a cable 30, is coupled to the trap 24 and extends into the electrical box 12.

In an exemplary embodiment, as illustrated in FIGS. 2, 3, 4, 5, 6 and 7, the trap 24 includes a horizontally-extending base 24a and a pair of arms 24b and 24c extending therefrom. The arm 24b includes a horizontally-extending portion 24ba, a vertically-extending portion 24bb and an outwardly angularly-extending portion 24bc. A channel 24bd is defined by the portions 24ba, 24bb and 24bc. A web 24be extends between the horizontally-extending portion 24ba and the angularly-extending portion 24bc, and along the vertically-extending portion 24bb. A transition portion 24bf angularly extends from the outer surface of the web 24be and to the vertically-extending portion 24bb.

A pair of arms 24d and 24e extend from the arms 24b and 24c, respectively. The arm 24d includes an inwardly angularly-extending portion 24da and a curved distal end portion 24db extending therefrom. From the angularly-extending portion 24da, the curved distal end portion 24db curves at least partially inwardly towards the arm 24e, then at least partially upwardly towards the arms 24b and 24c, and then at least partially outwardly away from the arm 24e, as most clearly shown in FIG. 3. Teeth 24dca, 24dcb and 24dcc extend from the curved distal end portion 24db, extending downwardly away from the arms 24b and 24c and inwardly towards the arm 24e. A slanted transition portion 24dd having rounds at its opposing ends is formed in the curved distal end portion 24db and the teeth 24dca, 24dcb and 24dcc.

The trap 24 is symmetric about a vertically-extending plane 32, which is shown in FIGS. 3, 5, 6 and 7. As a result, the arm 24c is the symmetric equivalent to the arm 24b, about the plane 32, and therefore the arm 24c will not be described in detail. In the description below, reference numerals used to refer to the features of the arm 24c will correspond to the reference numerals for the features of the arm 24b, except that the prefix for the reference numerals used to describe the arm 24b, that is, 24b, will be replaced by the prefix of the arm 24c, that is, 24c.

As another result of the symmetry of the trap 24 about the plane 32, the arm 24e is the symmetric equivalent to the arm 24d, about the plane 32, and therefore the arm 24e will not be described in detail. In the description below, reference numerals used to refer to the features of the arm 24e will correspond to the reference numerals for the features of the arm 24d, except that the prefix for the reference numerals used to describe the arm 24d, that is, 24d, will be replaced by the prefix of the arm 24e, that is, 24e.

A substantially continuous surface 24f is defined by the base 24a and the arms 24b and 24c. An upside-down-L-shaped ear 24g including a 180-degree round 24ga extends upward from the horizontally-extending portion 24ba of the arm 24b, thereby defining a region 24h between the surface 24f and the horizontally-extending portion of the ear 24g. A cavity 24i is formed in the vertically-extending portion of the ear 24g. Similarly, an upside-down-L-shaped ear 24j including a 180-degree round 24ja extends upward from the horizontally-extending portion 24ca of the arm 24c, thereby defining a region 24k between the surface 24f and the horizontally-extending portion of the ear 24j. A cavity 24l is formed in the vertically-extending portion of the ear 24j.

A fillet 24m extends between the angularly-extending portion 24bc of the arm 24b and the angularly-extending portion 24da of the arm 24d. Similarly, a fillet 24n extends between the angularly-extending portion 24cc of the arm 24c and the angularly-extending portion 24ea of the arm 24e.

A generally vertically-extending passage 24o is generally defined between the vertically-extending portions 24bb and 24cb of the arms 24b and 24c, respectively. A generally V-shaped passage 24p is generally defined between the teeth 24dca, 24dcb and 24dcc of the arm 24d and the teeth 24eca, 24ecb and 24ecc of the arm 24e, due to the directions of extension of the teeth and the curvature of the curved distal end portions 24db and 24eb. An opening 24q is defined by the base 24a and the arms 24b and 24c, and a round 24r is formed along the perimeter of the opening 24*q*. A protrusion 24*s* extends downward from the base 24*a*.

A cover 24*t* is coupled to the base 24*a*. In an exemplary embodiment, the cover 24*t* is hingedly coupled to the base 24*a*. In an exemplary embodiment, the cover 24*t* is hingedly coupled to the base 24*a* using a hinge 24*u*. The cover 24*t* includes tabs 24*ta* and 24*tb*, ends of which are flush with the distal end of the cover 24*t*, and a protrusion 24*tc*, which comprises a perimeter substantially corresponding to the perimeter of the opening 24*q*. A slot 24*td* is formed through the cover 24*t*. Chamfers 24*taa* and 24*tab* are formed in the tab 24*ta*, and chamfers 24*tba* and 24*tbb* are formed in the tab 24*tb*. The cover 24*t* further includes a surface 24*te* and a protrusion 24*ff*. The trap 24 further includes rounds 24*v* and 24*w*, which are formed in the vertically-extending portions 24*bb* and 24*cb*, respectively.

In an exemplary embodiment, the trap 24 is composed of a plastic material. In an exemplary embodiment, the trap 24 is composed of Lexan 950. In an exemplary embodiment, the trap 24 is composed of Makrolon 6485. In several exemplary embodiments, the trap 24 is composed of a plastic material that is of a grade suitable for injection molding and/or compression molding, such as, for example, polyethylene, polypropylene, polycarbonate, nylon, polyurethane and/or any combination thereof.

As noted above, the trap 24 may be placed in an open configuration or a closed configuration. In an exemplary embodiment, as illustrated in FIGS. 2-7, the trap 24 is in an open configuration in which the cable 30, or the like, is permitted to extend between the arms 24*b* and 24*c*, and through the opening 24*q* and the passage 24*o*, in a manner and under conditions to be described.

Figure 7:
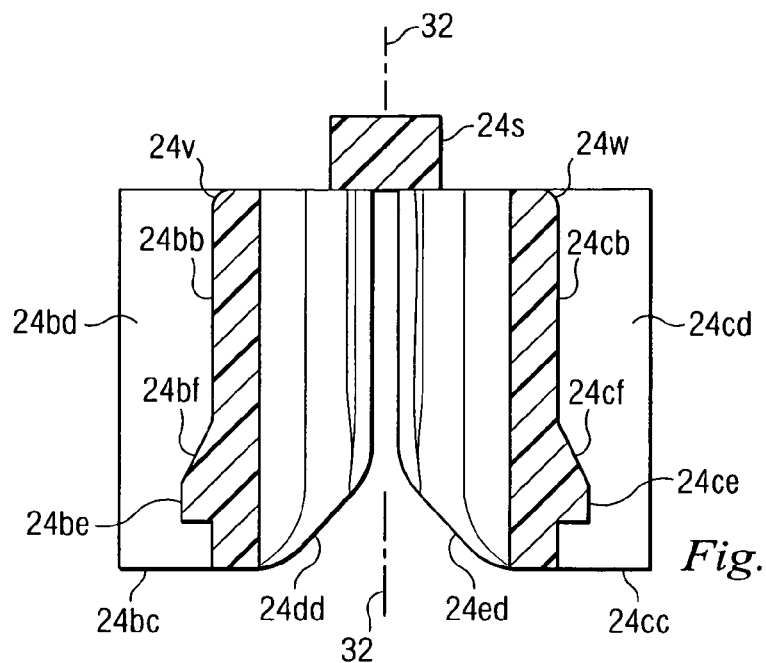
FIG. 7 is a sectional view of the trap of FIG. 3 taken along line 7-7.
Figure 8:
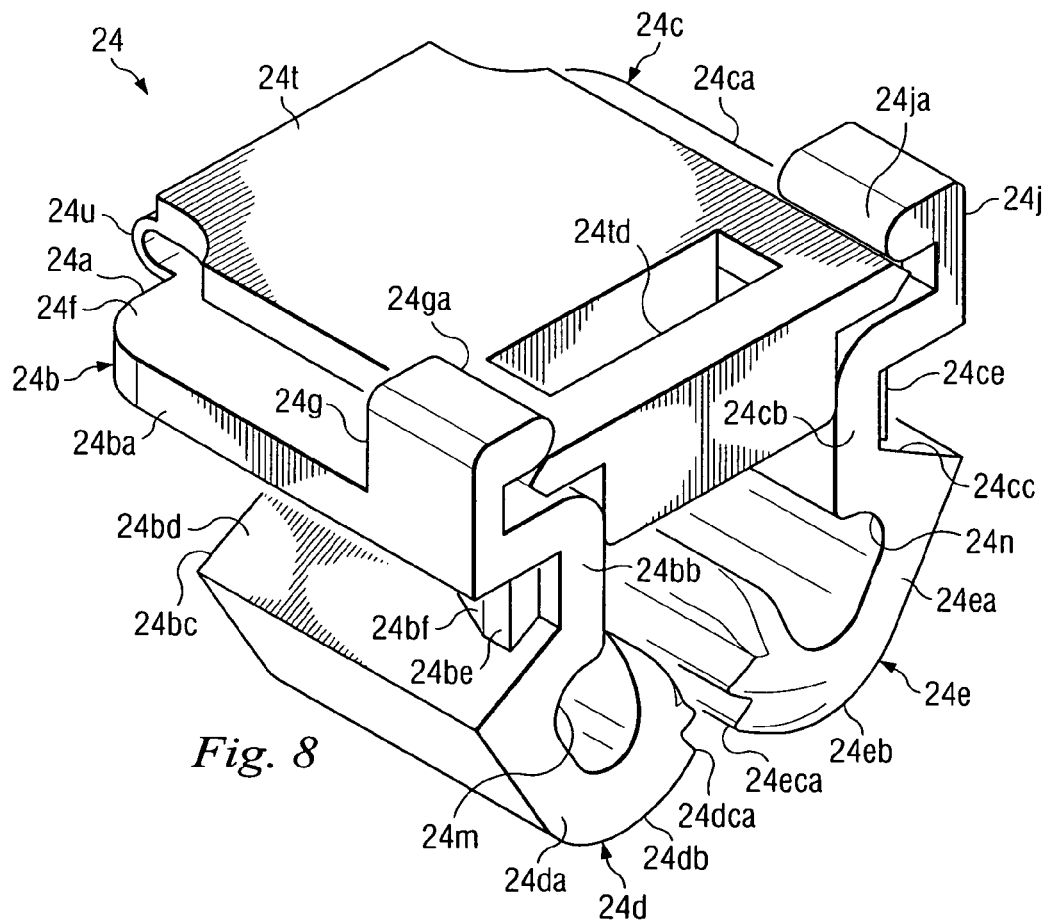
FIG. 8 is a view similar to that of FIG. 2, but depicting the trap in another configuration.

In an exemplary embodiment, to change the configuration of the trap 24 from the open configuration as illustrated in FIGS. 2-7 to the closed configuration as illustrated in FIG. 8, the cover 24*t* is rotated about the hinge 24*u* and towards the surface 24*f*. As the cover 24*t* approaches the surface 24*f*, the tabs 24*ta* and 24*tb* engage the rounds 24*ga* and 24*ja*, respectively, of the ears 24*g* and 24*j*, respectively. The cover 24*t* is further rotated about the hinge 24*u* and towards the surface 24*f*, forcing the tabs 24*ta* and 24*tb*, and/or the ears 24*g* and 24*j*, to flex and/or deflect in order to permit the tabs 24*ta* and 24*tb* to rotate past the rounds 24*ga* and 24*ja*, respectively. The chamfers 24*taa* and 24*tba*, and the rounds 24*ga* and 24*ja*, facilitate this flexing and/or deflection by providing lead-in, transitional sliding-engagement surfaces for the engagements between the tabs 24*ta* and 24*tb* and the ears 24*g* and 24*j*, respectively.

Before, during and/or after the rotation of the tabs 24*ta* and 24*tb* past the ears 24*g* and 24*j*, respectively, the protrusion 24*tc* of the cover 24*t* is received into the opening 24*q* so that at least a portion of the protrusion 24*tc* at least partially extends through the opening 24*q*. The round 24*r*, and the correspondence between the perimeters of the protrusion 24*tc* and the opening 24*q*, facilitate the receipt of the protrusion 24*tc* into the opening 24*q*.

After the tabs 24*ta* and 24*tb* rotate past the ears 24*g* and 24*j*, respectively, the tabs 24*ta* and 24*tb* at least partially extend within the cavities 24*i* and 24*l*, respectively, and other portions of the cover 24*t* may extend within the regions 24*h* and 24*k*, respectively. Moreover, the surface 24*te* of the cover 24*t* is proximate or engages the surface 24*f*. As a result, the trap 24 is in the closed configuration as illustrated in FIG. 8, and the cable 30 is prevented from extending between the arms 24*b* and 24*c*, and through the opening 24*q* and the passage 24*o*. The engagement between the surfaces 24*te* and 24*f* prevents any further appreciable rotation of the cover 24*t* about the hinge 24*u* and towards the surface 24*f*. In an exemplary embodiment, the cover 24*t* snaps into place during the above-described placing of the trap 24 in the closed configuration.

To change the configuration of the trap 24 from the closed configuration as illustrated in FIG. 8 to the open configuration as illustrated in FIG. 7, the cover 24*t* is rotated about the hinge 24*u* and away from the surface 24*f*. In an exemplary embodiment, a tool such as, for example, the distal end of a flat-head screwdriver is positioned in the slot 24*td* and manipulated to pry the cover 24*t* back and initiate the rotation about the hinge 24*u*. During this rotation, the tabs 24*ta* and 24*tb*, and/or the ears 24*g* and 24*j*, are forced to flex and/or deflect in order to permit the tabs 24*ta* and 24*tb* to rotate past the rounds 24*ga* and 24*ja*, respectively. The chamfers 24*tab* and 24*tbb* facilitate this flexing and/or deflection by providing relatively smooth, transitional sliding engagements between the tabs 24*ta* and 24*tb* and the ears 24*g* and 24*j*, respectively.

In several exemplary embodiments, the cover 24*t* may be placed in a wide variety of positions, relative to the ears 24*g* and 24*j*, when the trap 24 is in the open configuration. For example, the cover 24*t* may rest against the ears 24*g* and 24*j*, with the tabs 24*ta* and 24*tb* contacting the rounds 24*ga* and 24*ja*, respectively. For another example, the cover 24*t* may be positioned so that the surface 24*te* of the cover 24*t* is substantially coplanar with the surface 24*f*.

In an exemplary embodiment, each of the traps 26 and 28 is substantially identical to the trap 24 and therefore the traps 26 and 28 will not be described in detail.

Figure 9:
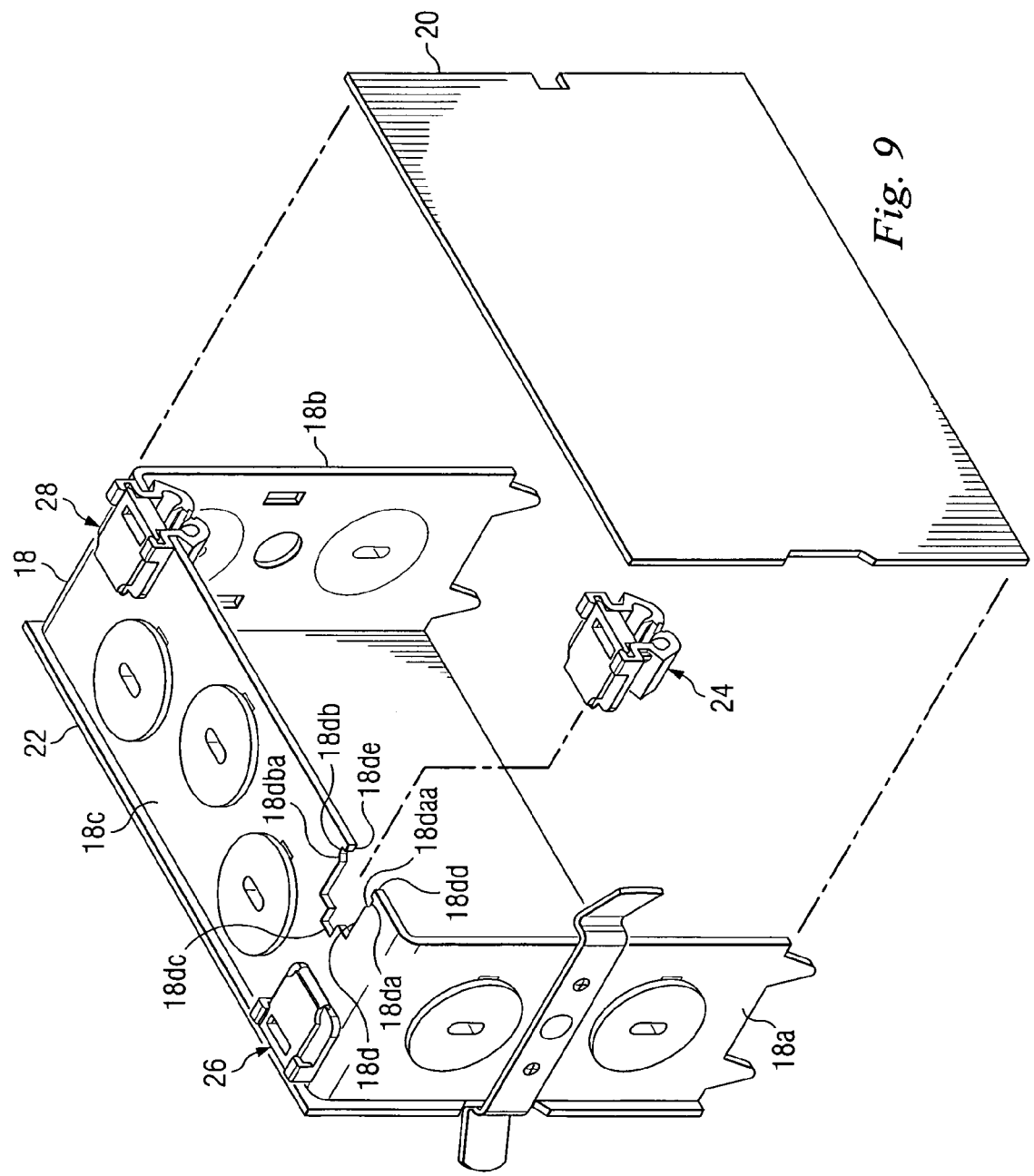
FIG. 9 is a partially exploded/partially unexploded view of the electrical box of FIG. 1.

In an exemplary embodiment, as illustrated in FIG. 9, the bracket 18 of the electrical box 12 includes vertically-extending plates 18*a* and 18*b* and a horizontally-extending plate 18*c* extending therebetween. In an exemplary embodiment, the plates 18*a*, 18*b* and 18*c* are part of a single, integral plate that is bent to form the bracket 18. A notch 18*d*, which receives the trap 24, is formed in the plate 18*c*. The notch 18*d* includes cut-outs 18*da* and 18*db* including slanted portions 18*daa* and 18*dba*, respectively, and a generally rectangular-shaped cut-out 18*dc*. Corners 18*dd* and 18*de* are defined by the notch 18*ca*. The notch 18*d* is symmetric about an imaginary plane that is perpendicular to the plate 18*c* and that extends through the center of the notch 18*d*. Two additional notches are formed in the plate 18*c* and receive the traps 26 and 28, respectively; these additional notches are substantially similar to the notch 18*d* and therefore will not be described in detail.

To assemble the electrical box 12, in an exemplary embodiment and as illustrated in FIGS. 9, 10, 11 and 12, the trap 24 is placed in the closed configuration and is moved towards the notch 18*ca* in a horizontal, or lateral, direction so that the opposing walls of the plate 18*c* defined by the notch 18*d* enter into, and at least partially extend within, the channels 24*bd* and 24*cd* of the trap 24. In an exemplary embodiment, the rounds 24*v* and 24*w* facilitate the entrance of the walls of the plate 18*c* into the channels 24*bd* and 24*cd*, providing lead-in, transitional sliding-engagement surfaces for any engagements between the rounds 24*bd* and 24*cd* and the corners 18*dd* and 18*de*, respectively of the notch 18*d*.

Figure 10:
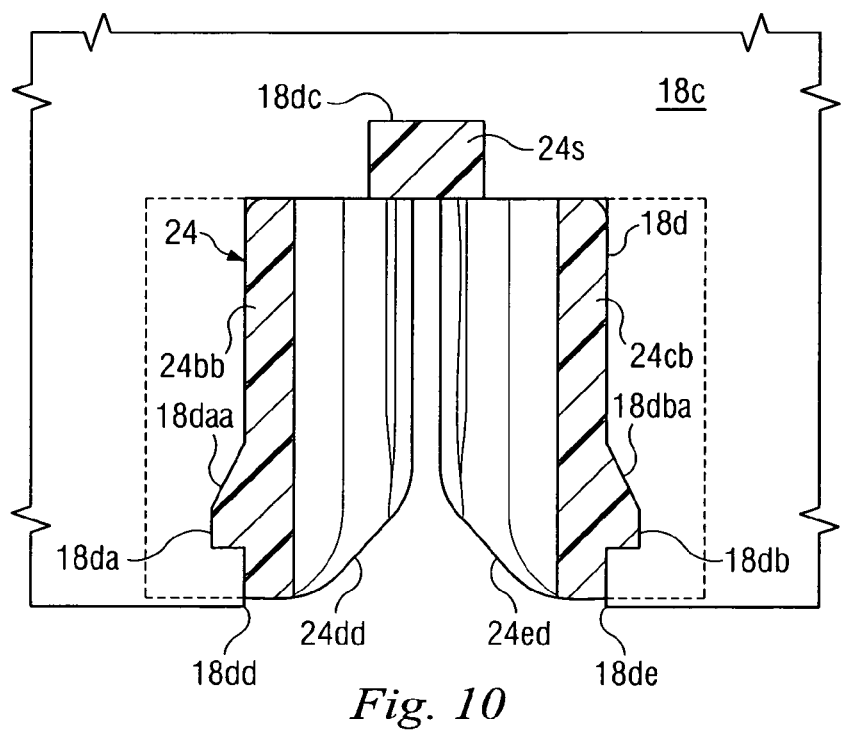
FIG. 10 is a sectional view similar to that of FIG. 7, but depicting the trap of FIG. 1 coupled to the electrical box of FIG. 1.

The trap 24 continues to be inserted into, and thus received by, the notch 18*d*, with the opposing walls of the plate 18*c* defined by the notch extending into the channels 24*bd* and 24*cd* and being proximate, or contacting, the vertically-extending portions 24*bd* and 24*cd*, respectively, of the arms 24*b* and 24*c*, respectively. As the insertion of the trap 24 into the notch 18*d* continues, the corners 18*dd* and 18*de* contact the transition portions 24*bf* and 24*cf*, respectively, of the arms 24*b* and 24*c*, respectively. As the corners 18*dd* and 28*de* slide along the transition portions 24*bf* and 24*cf*, respectively, the arms 24b and 24c are forced towards each other, resulting in the arms 24b and 24c being outwardly biased away from each other. This sliding continues until the webs 24be and 24ce are disposed between the corners 18dd and 18ee, at which point the webs 24be and 24ce slide along the opposing walls of the plate 18c defined by the notch 18d, with the arms 24b and 24c continuing to be forced towards each other. This forcing continues until the webs 24be and 24ce extend into the cut-outs 18da and 18db, respectively, snapping into place so that the transition portions 24bf and 24cf mate with the slanted portions 18daa and 18dbaa, respectively, of the cut-outs 18da and 18db, respectively, and the protrusion 24s extends into the cut-out 18dc, as illustrated in FIG. 10.

As a result of the insertion of the trap 24 into the notch 18d, the trap 24 is coupled to the plate 18c of the electrical box 12. The extension of the plate 18cc into the channels 24bd and 24cd generally prevents substantial relative vertical movement between the trap 24 and the plate 18c, and the extension of the webs 24be and 24ce into the cut-outs 18da and 18db, respectively, generally prevents substantial relative horizontal movement between the trap 24 and the plate 18c. In an exemplary embodiment, when the trap 24 is coupled to the plate 18c, the arms 24b and 24c of the trap 24 are forced towards each other, thereby causing the arms 24b and 24c to be outwardly biased away from each other and the trap 24 to be snugly fit in the notch 18d. In an alternate exemplary embodiment, a degree of play of the trap 24 is present when the trap 24 is coupled to the plate 18c, that is, the trap 24 is able to shift, relative to the plate 18c, while still being coupled to the plate 18c in the manner described above.

In an exemplary embodiment, the trap 24 is uncoupled from the plate 18c of the electrical box 12 by first forcing or squeezing the arms 24b and 24c of the trap 24 towards each other so that the webs 24be and 24ce no longer extend in the cut-outs 18da and 18db, respectively. While maintaining the arms 24b and 24c in this squeezed condition, the trap 24 is pulled out of the notch 18d, thereby uncoupling the trap 24 from the plate 18c. In an exemplary embodiment, the trap 24 is placed in the open configuration before, during and/or after the coupling of the trap 24 to the plate 18c of the electrical box 12.

In an exemplary embodiment, the traps 26 and 28 are coupled and optionally uncoupled to the plate 18c in a manner substantially similar to the manner in which trap 24 is coupled and optionally uncoupled to the plate 18c, and therefore the coupling and optional uncoupling of the traps 26 and 28 to the plate 18c will not be described in detail.

After coupling the traps 24 and 28 to the plate 18c, the cover 20 is coupled to the bracket 18. Similarly, after coupling the trap 26 to the plate 18c, the cover 22 is coupled to the bracket 18. After coupling the covers 20 and 22 to the bracket 18, the electrical box 12 is assembled. In an exemplary embodiment, the only significant openings in the plate 18c are the relatively-small slot 24td of the cover 24t of the trap 24, and the relatively-small slots of the traps 26 and 28 that correspond to the slot 24td. In an exemplary embodiment, this absence of other significant openings in the plate 18c assists in the electrical box 12 meeting one or more standards for junction or electrical boxes set by Underwriters Laboratories (UL).

Since the cable trap 24 uses the cover 24t to place the trap 24 in the closed configuration, as described above, and the cable traps 26 and 28 use respective covers that are substantially similar to the cover 24t to place the cable traps 26 and 28 in the closed configuration, the covers 20 and 22 do not include design features that have the sole purpose of placing the traps 24, 26 and 28 in their respective closed configurations when the electrical box 12 is assembled. As a result, in several exemplary embodiments, the covers 20 and 22 are standard covers that may be used on different types of electrical boxes, in addition to the electrical box 12, rather than being custom covers specifically designed for use with the traps 24, 26 and 28.

Figure 11:
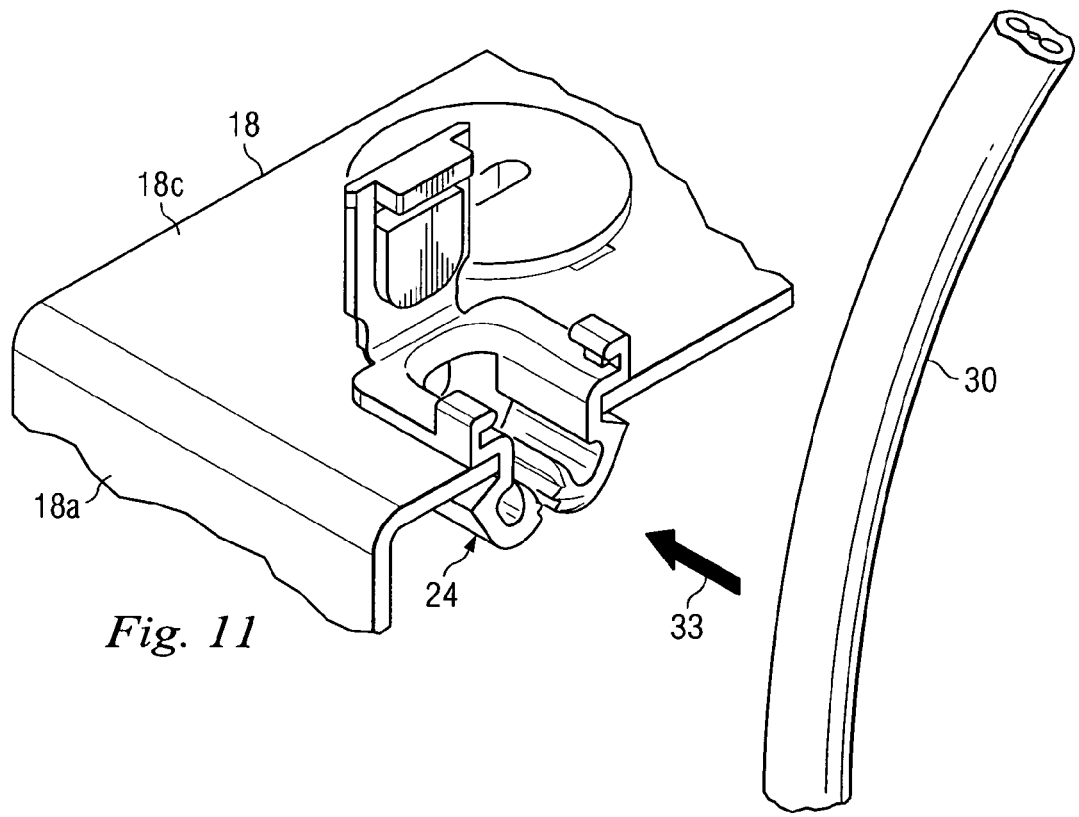
FIG. 11 is a partially exploded/partially unexploded view of a portion of the electrical box of FIG. 1, which depicts the cable of FIG. 1 being coupled to the electrical box of FIG. 1.
Figure 12:
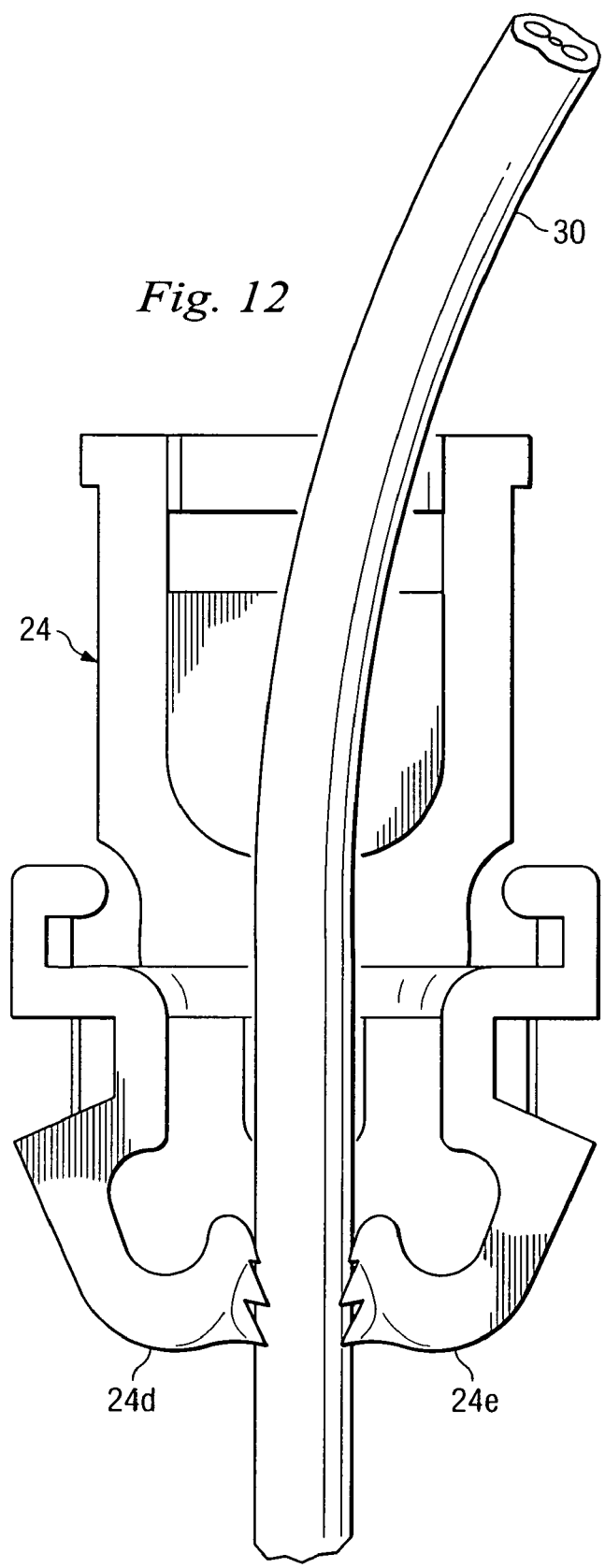
FIG. 12 is a front elevational view similar to that of FIG. 3, but depicting the cable of FIG. 11 secured to the trap of FIG. 1.

In an exemplary embodiment, as illustrated in FIGS. 11 and 12, the cable 30 is coupled, or secured, to the trap 24 by inserting the cable 30 between the arms 24b and 24c, and between the arms 24d and 24e, so that the arms 24d and 24e engage and secure the cable 30 to the trap 24. More particularly, if the cover 20 is coupled to the electrical box 12 and the trap 24 is in the closed configuration, the cover 20 is uncoupled from the electrical box 12 and the trap 24 is placed in the open configuration. The cable 30 is then moved towards the trap 24 in a direction indicated by an arrow 33 in FIG. 11.

As the cable 30 initially engages the arms 24d and 24e, the transition portions 24dd and 24ed guide the cable 30 into the trap 24 and between the curved distal end portions 24db and 24eb. As the cable 30 is moved between the curved distal end portions 24db and 24eb in the direction indicated by the arrow 33, the arms 24d and 24e are forced apart. After the cable 30 is moved past the transition portions 24dd and 24ed, movement of the cable 30 is stopped. The arms 24d and 24e continue to be forced apart by the presence of the cable 30 therebetween, thereby causing the arms 24d and 24e to be inwardly biased towards each other, and further causing the teeth 24dca, 24dcb, 24dcc, 24eca, 24ecb and 24ecc, and/or other portions of the curved distal end portions 24db and 24eb, to engage the cable 30. As a result, the cable 30 extends through the passage 24o and the V-shaped passage 24p, as illustrated in FIG. 12. As another result, the cable 30 is secured to the trap 24 and therefore to the electrical box 12.

In an exemplary embodiment, when the arms 24d and 24e are forced apart as illustrated in FIG. 12, the arm 24d flexes primarily about the intersection between the angularly-extending portion 24bc of the arm 24b and the angularly-extending portion 24da of the arm 24d, and the fillet 24m facilitates this flexing by reducing the stress levels generated at this interface. Similarly, in an exemplary embodiment, when the arms 24d and 24e are forced apart, the arm 24e flexes primarily about the intersection between the angularly-extending portion 24cc of the arm 24c and the angularly-extending portion 24ea of the arm 24e, and the fillet 24n facilitates this flexing by reducing the stress levels generated at this interface.

In operation, the trap 24 provides strain relief to the cable 30 and generally prevents any substantial relative movement between the cable 30 and the electrical box 12. More particularly, the trap 24 secures the cable 30 to the trap 24, and therefore to the electrical box 12, because of the inwardly-biased, curved distal end portions 24db and 24eb engaging the cable 30. The shapes of the curved distal end portions 24db and 24eb facilitate the engagement of the cable 30 therewith in that the curving of the portions 24db and 24eb towards each other and then away from each other provides a suitable amount of contact-force area between the cable 30 and the portions 24db and 24eb.

In addition to the securing forces applied on the cable 30 by the arms 24d and 24e, the teeth 24dca, 24dcb, 24dcc, 24eca, 24ecb and 24ecc further resist any relative movement between the trap 24 and the plate 18c, and, due to their above-described directions of extension, especially resist any pull-out of the cable 30 out of the electrical box 12.

In several exemplary embodiments, the trap 24 accommodates and secures a wide variety of cable sizes, without the need to modify the orientation of the trap 24 relative to the plate 18c and the electrical box 12. The shapes of the curved distal end portions 24db and 24eb, and the inward biasing of the arms 24d and 24e, appreciably facilitate the accommodation and securing of differently-sized cables. In an exemplary embodiment, the cable 30 is a 12-gauge cable with two conductors. In an exemplary embodiment, the cable 30 is a 12-gauge cable with three conductors. In an exemplary embodiment, the cable 30 is a 14-gauge cable with two conductors. In an exemplary embodiment, the cable 30 is a 14-gauge cable with three conductors.

In several exemplary embodiments, before, during or after the securing of the cable 30 to the trap 24, the cable 30 is electrically coupled to one or more devices and/or other cables such as, for example, one or more cables that supply electrical power to the lighting fixture 10.

In several exemplary embodiments, the cover 24t permits the trap 24 to be placed in the open or closed configuration, as necessary and/or desired. Moreover, the trap 24 is easily placed in the open configuration from the closed configuration, or vice versa, without causing permanent changes to the structure of the trap 24, the bracket 18c or the cover 20. As a result, the cover 24t provides flexibility since the position of the cable 30, relative to the electrical box 12, may be quickly and easily modified at any time. For example, instead of the trap 24, the cable 30 may extend through the trap 26 or 28, with the trap 24 being placed in the closed configuration in the manner described above. In an exemplary embodiment, before placing the trap 24 in the closed configuration from the open configuration, the cable 30 may be uncoupled from the trap 24 by applying force to the cable 30 in a horizontal direction opposing the direction indicated by the arrow 33, in order to pull the cable 30 out from between the arms 24db and 24eb. The cable 30 may then be coupled to the trap 26 or 28 in a manner substantially similar to the above-described manner in which the cable 30 is coupled to the trap 24.

In an exemplary embodiment, instead of, or in addition to inserting the cable 30 into the trap 24 in the horizontal, or lateral, direction indicated by the arrow 33, the cable 30 is inserted into the trap 24 in a vertical direction, which is perpendicular to the direction indicated by the arrow 33. The cable 30 first moves downward through the passage 24o and then engages the arms 24d and 24e, with the teeth 24dca and 24eca guiding the cable 30 into the V-shaped passage 24p. As the cable 30 moves into the V-shaped passage 24p, the arms 24d and 24e are forced apart. The shapes of the curved distal end portions 24db and 24eb, and the directions of extension of the teeth 24dca 24dcb, 24dcc, 24eca, 24ecb and 24ecc facilitate the entrance and movement of the cable 30 between the arms 24d and 24e in a vertical direction. In several exemplary embodiments, the cable 30 must be rigid enough, and/or the rigidity of the cable 30 must be enhanced using a guide such as, for example, a rigid, vertically-extending member, in order for the cable 30 to be inserted into the trap 24 from a vertical direction. In several exemplary embodiments, the operation of the trap 24 with respect to the cable 30 is the same, regardless of the direction of insertion of the cable 30 into the trap 24.

Figure 13:
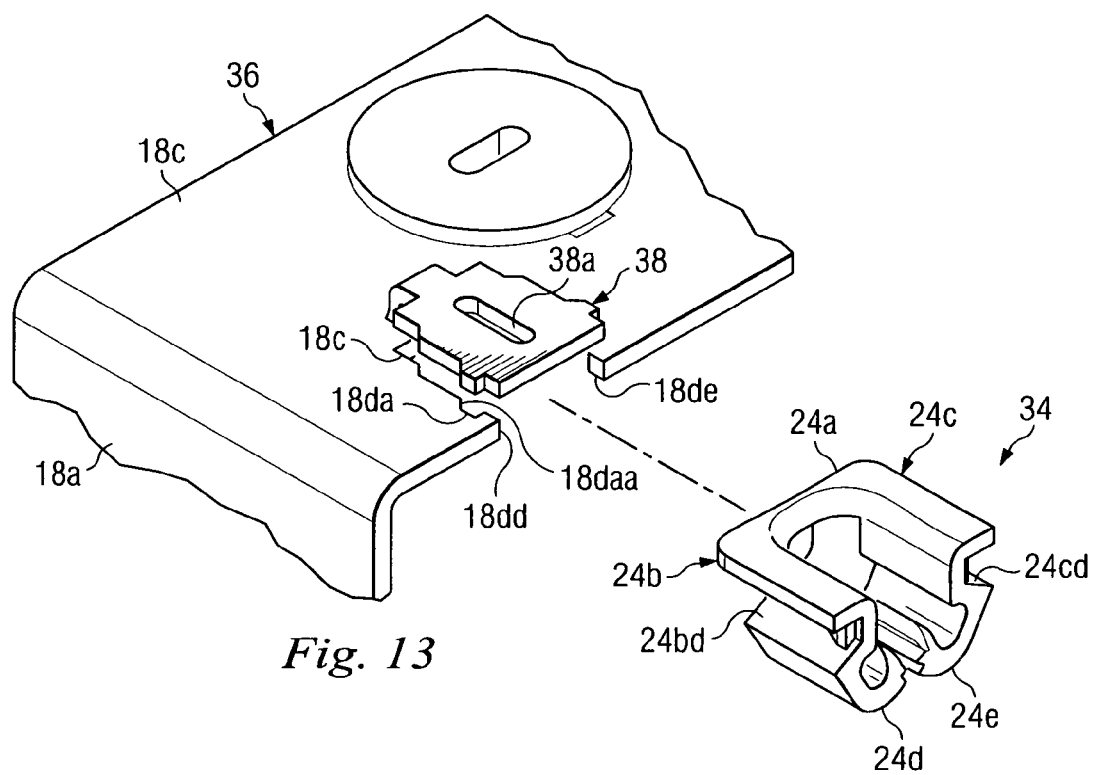
FIG. 13 is a partially exploded/partially unexploded view of a bracket of an electrical box, and of a trap, according to another embodiment of the present disclosure.

In an exemplary embodiment, as illustrated in FIG. 13, another embodiment of a trap is generally referred to by the reference numeral 34 and contains several parts of the trap 24 of FIGS. 1-12, which are given the same reference numerals. In FIG. 13, the trap 34 does not include the cover 24t and the hinge 24u. The remainder of the trap 34 is substantially identical to the trap 24 and therefore will not be described in detail.

In an exemplary embodiment, as illustrated in FIG. 13, another embodiment of a bracket is generally referred to by the reference numeral 36 and includes several parts of the bracket 18 of FIGS. 1, 9, 10 and 11, which are given the same reference numerals. In FIG. 13, the notch 18d is formed in the plate 18c of the bracket 36 by forming a knock-out 38 so that the knock-out 38 is elevated over the notch 18d, but is also coupled to the plate 18c. The outline or perimeter of the knock-out 38 generally corresponds to the outline or perimeter of the notch 18d and therefore the outline or perimeter of the knock-out 38 will not described in detail. A slot 38a is formed through the knock-out 38.

In an exemplary embodiment, the trap 34 is received by the notch 18c, and thus coupled to the plate 18c of the bracket 36, in a manner substantially identical to the above-described manner in which the trap 24 is coupled to the plate 18c of the bracket 18. Therefore, the coupling of the trap 34 to the plate 18c will not be described in detail.

In an exemplary embodiment, to insert the cable 30 into the trap 34 after the trap 34 is coupled to the plate 18c of the bracket 36, the knock-out 38 is removed to permit the cable 30 to extend between the arms 24b and 24c, and between the arms 24d and 24e, of the trap 34. In an exemplary embodiment, the knock-out 38 is removed by inserting a tool such as, for example, the distal end of a flat-head screwdriver, into the slot 38a and prying the knock-out 38 back, and/or off of the plate 18c, using the tool.

An apparatus to which a line is adapted to be secured has been described, the apparatus being configured to be inserted into a notch in a plate and including a base at least partially defining an opening through which the line is adapted to extend; and a cover coupled to the base; wherein the apparatus comprises an open configuration in which the line is permitted to extend through the opening, and a closed configuration in which the cover prevents the line from extending through the opening. In an exemplary embodiment, the cover is hingedly coupled to the base. In an exemplary embodiment, the apparatus comprises a pair of arms extending from the base and at least partially defining the opening through which the line is adapted to extend. In an exemplary embodiment, the apparatus comprises a pair of ears extending from the pair of arms, respectively; wherein the cover comprises a pair of tabs; wherein a surface is defined by the base and the first pair of arms; and wherein, when the apparatus is in the closed configuration, at least a portion of each tab extends between one of the ears and the surface to maintain the apparatus in the closed configuration. In an exemplary embodiment, each of the arms comprises a web adapted to extend into at least a portion of the notch to secure the apparatus to the plate when the apparatus is inserted into the notch. In an exemplary embodiment, the apparatus comprises a second pair of arms extending from the first pair of arms, respectively, and between which the line is adapted to extend, each arm in the second pair of arms comprising a curved distal end portion that is adapted to engage the line so that the respective curved distal end portions secure the line to the apparatus, each curved distal end portion curving towards and then away from the other curved distal end portion. In an exemplary embodiment, the plate is part of an electrical box; and wherein the line comprises a cable.

An apparatus has been described that includes a trap to which a line is adapted to be secured, the trap comprising a first pair of arms between which the line is adapted to extend; and a second pair of arms extending from the first pair of arms, respectively, and between which the line is adapted to extend, each arm in the second pair of arms comprising a curved distal end portion that is adapted to engage the line so that the respective curved distal end portions secure the line to the apparatus. In an exemplary embodiment, each curved distal end portion curves towards and then away from the other curved distal end portion. In an exemplary embodiment, each curved distal end portion comprises at least one tooth extending in a direction towards the other curved distal end portion and away from the first pair of arms; and wherein, when the curved distal end portions engage the line, the teeth resist relative movement between the line and the curved distal end portions in at least one direction. In an exemplary embodiment, each arm in the second pair of arms is inwardly biased toward the other arm in the second pair arms when the line extends between the second pair of arms. In an exemplary embodiment, the trap comprises a generally V-shaped passage defined by the curved distal end portions of the arms in the second pair of arms; wherein the line is adapted to extend through the generally V-shaped passage when the curved distal end portions engage the line. In an exemplary embodiment, each curved distal end portion of each arm in the second pair of arms comprises a slanted transition portion that is adapted to facilitate the insertion of the line between the curved distal end portions in a lateral direction. In an exemplary embodiment, each arm in the first pair of arms comprises an angularly-extending portion that extends away from the other arm in the first pair of arms; wherein each arm in the second pair of arms comprises an angularly-extending portion that extends from the respective angularly-extending portion of the respective arm in the first pair of arms and towards the other arm in the second pair of arms; and wherein the curved distal end portions extend from the respective angularly-extending portions of the arms in the second pair of arms. In an exemplary embodiment, the trap is adapted to receive the line in a direction comprising at least one of a lateral direction, and a direction that is generally perpendicular to the lateral direction. In an exemplary embodiment, the trap further comprises a base from which the arms in the first pair of arms extend; a cover hingedly coupled to the base; an open configuration in which the line is permitted to extend between the first pair of arms; and a closed configuration in which the cover prevents the line from extending between the first pair of arms. In an exemplary embodiment, the apparatus comprises a plate to which the trap is coupled, the plate comprising a notch into which the trap is inserted to couple the trap to the plate; wherein each arm in the first pair of arms comprises a channel into which at least a portion of the plate extends. In an exemplary embodiment, the apparatus comprises a knock-out coupled to the plate and comprising an outline that is substantially similar to the outline of the notch. In an exemplary embodiment, the apparatus comprises an electrical box of which the plate is part; wherein the line extends into the electrical box.

An apparatus has been described that includes an electrical box comprising a plate comprising a notch; and a trap inserted into the notch so that the trap is coupled to the plate, wherein a line is adapted to be secured to the trap so that the line extends into the electrical box; wherein the trap comprises a first pair of arms between which the line is adapted to extend; a second pair of arms extending from the first pair of arms, respectively, and between which the line is adapted to extend, each arm in the second pair of arms comprising a curved distal end portion that is adapted to engage the line so that the respective curved distal end portions secure the line to the apparatus; a base from which the arms in the first pair of arms extend; a cover hingedly coupled to the base; an open configuration in which the line is permitted to extend between the first pair of arms; a closed configuration in which the cover prevents the line from extending between the first pair of arms; and a pair of ears extending from the first pair of arms, respectively; wherein the cover comprises a pair of tabs; wherein a surface is defined by the base and the first pair of arms; wherein, when the apparatus is in the closed configuration, at least a portion of each tab extends between one of the ears and the surface to maintain the apparatus in the closed configuration; wherein each curved distal end portion curves towards and then away from the other curved distal end portion; wherein each curved distal end portion comprises at least one tooth extending in a direction towards the other curved distal end portion and away from the first pair of arms; wherein, when the curved distal end portions engage the line, the teeth resist relative movement between the line and the curved distal end portions in at least one direction; wherein each arm in the second pair of arms is inwardly biased toward the other arm in the second pair arms when the line extends between the second pair of arms; wherein each curved distal end portion comprises a slanted transition portion that is adapted to facilitate the insertion of the line between the curved distal end portions in a lateral direction; wherein each arm in the first pair of arms comprises an angularly-extending portion that extends away from the other arm in the first pair of arms; wherein each arm in the second pair of arms comprises an angularly-extending portion that extends from the respective angularly-extending portion of the respective arm in the first pair of arms and towards the other arm in the second pair of arms; wherein the curved distal end portions extend from the respective angularly-extending portions of the arms in the second pair of arms; wherein each arm in the first pair of arms comprises a channel into which at least a portion of the plate extends; and wherein each of the arms in the first pair of arms comprises a web adapted to extend into at least a portion of the notch to secure the apparatus to the plate when the apparatus is inserted into the notch.

A method has been described that includes coupling a trap to a plate comprising a notch, comprising inserting the trap into the notch; optionally placing the trap in a configuration so that a line is permitted to extend through the trap; and optionally placing the trap in a configuration so that the line is prevented from extending through the trap. In an exemplary embodiment, the method comprises coupling the line to the trap so that the line extends through the trap after optionally placing the trap in a configuration so that the line is permitted to extend through the trap. In an exemplary embodiment, the trap comprises a pair of arms; and wherein coupling the line to the trap comprises engaging the arms with the line, comprising moving the line in a lateral direction so that the line extends between the arms and the arms are inwardly biased towards each other. In an exemplary embodiment, each of the arms comprises a curved distal end portion that engages the line when the line extends between the arms. In an exemplary embodiment, the plate is part of an electrical box; and wherein the line extends into the electrical box.

A method has been described that includes coupling a trap to a plate comprising a notch, wherein coupling the trap to the plate comprises inserting the trap into the notch, and wherein the trap comprises a pair of arms; and coupling a line to the trap so that the line extends through the trap, comprising engaging the arms with the line; wherein each of the arms comprises a curved distal end portion that engages the line. In an exemplary embodiment, engaging the arms with the line comprises moving the line in a lateral direction so that the line extends between the arms and the arms are inwardly biased towards each other. In an exemplary embodiment, the method comprises optionally placing the trap in a configuration so that the line is permitted to extend through the trap; and optionally placing the trap in a configuration so that the line is prevented from extending through the trap. In an exemplary embodiment, coupling the line to the trap so that the line extends through the trap comprises coupling the line to the trap so that the line extends through the trap after optionally placing the trap in a configuration so that the line is permitted to extend through the trap. In an exemplary embodiment, the plate is part of an electrical box; and wherein the line extends into the electrical box.

A method has been described that includes coupling a trap to a plate comprising a notch, wherein coupling the trap to the plate comprises inserting the trap into the notch, and wherein the trap comprises a pair of arms; coupling a line to the trap so that the line extends through the trap, comprising engaging the arms with the line, wherein each of the arms comprises a curved distal end portion that engages the line; optionally placing the trap in a configuration so that the line is permitted to extend through the trap; optionally placing the trap in a configuration so that the line is prevented from extending through the trap; wherein coupling the line to the trap comprises coupling the line to the trap so that the line extends through the trap after optionally placing the trap in a configuration so that the line is permitted to extend through the trap; wherein engaging the arms with the line comprises moving the line in a lateral direction so that the line extends between the arms and the arms are inwardly biased towards each other; wherein the plate is part of an electrical box; and wherein the line extends into the electrical box.

A system has been described that includes means for coupling a trap to a plate comprising a notch, comprising means for inserting the trap into the notch; means for optionally placing the trap in a configuration so that a line is permitted to extend through the trap; and means for optionally placing the trap in a configuration so that the line is prevented from extending through the trap. In an exemplary embodiment, the system comprises means for coupling the line to the trap so that the line extends through the trap after optionally placing the trap in a configuration so that the line is permitted to extend through the trap. In an exemplary embodiment, the trap comprises a pair of arms; and wherein means for coupling the line to the trap comprises means for engaging the arms with the line, comprising means for moving the line in a lateral direction so that the line extends between the arms and the arms are inwardly biased towards each other. In an exemplary embodiment, each of the arms comprises a curved distal end portion that engages the line when the line extends between the arms. In an exemplary embodiment, the plate is part of an electrical box; and wherein the line extends into the electrical box.

A system has been described that includes means for coupling a trap to a plate comprising a notch, wherein means for coupling the trap to the plate comprises means for inserting the trap into the notch, and wherein the trap comprises a pair of arms; and means for coupling a line to the trap so that the line extends through the trap, comprising means for engaging the arms with the line; wherein each of the arms comprises a curved distal end portion that engages the line. In an exemplary embodiment, means for engaging the arms with the line comprises means for moving the line in a lateral direction so that the line extends between the arms and the arms are inwardly biased towards each other. In an exemplary embodiment, the system comprises means for optionally placing the trap in a configuration so that the line is permitted to extend through the trap; and means for optionally placing the trap in a configuration so that the line is prevented from extending through the trap. In an exemplary embodiment, means for coupling the line to the trap so that the line extends through the trap comprises means for coupling the line to the trap so that the line extends through the trap after optionally placing the trap in a configuration so that the line is permitted to extend through the trap. In an exemplary embodiment, the plate is part of an electrical box; and wherein the line extends into the electrical box.

A system has been described that includes means for coupling a trap to a plate comprising a notch, wherein means for coupling the trap to the plate comprises means for inserting the trap into the notch, and wherein the trap comprises a pair of arms; means for coupling a line to the trap so that the line extends through the trap, comprising means for engaging the arms with the line, wherein each of the arms comprises a curved distal end portion that engages the line; means for optionally placing the trap in a configuration so that the line is permitted to extend through the trap; means for optionally placing the trap in a configuration so that the line is prevented from extending through the trap; wherein means for coupling the line to the trap comprises means for coupling the line to the trap so that the line extends through the trap after optionally placing the trap in a configuration so that the line is permitted to extend through the trap; wherein means for engaging the arms with the line comprises means for moving the line in a lateral direction so that the line extends between the arms and the arms are inwardly biased towards each other; wherein the plate is part of an electrical box; and wherein the line extends into the electrical box.

It is understood that variations may be made in the foregoing without departing from the scope of the disclosure. For example, instead of the cable 30, the traps 24, 26 and 28 may be used to secure other types of lines such as, for example, wire, cord, string, rope, twine, thread, braided bands and other types of bands, tape, tubing, tether, fabric, mesh, sheet, chain, or any combination thereof. Moreover, the line may serve a wide variety of functions including, but not limited to, mechanical, electrical or electro-mechanical functions.

Any spatial references such as, for example, "upper," "lower," "above," "below," "between," "vertical," "horizontal," "angular," "upward," "downward," "side-to-side," "left-to-right," "right-to-left," "top-to-bottom," "bottom-to-top," etc., are for the purpose of illustration only and do not limit the specific orientation or location of the structure described above.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:
1. An apparatus comprising:
a trap to which a line is adapted to be secured, the trap comprising:
a base;

a first pair of arms coupled to the base and between which a first cavity is defined, each of the first pair of arms comprising:
  a substantially horizontal portion comprising a top surface;
  a pair of ears, each ear extending upward from one of the respective first pair of arms;
  a cover rotatably coupled to the base, the cover comprising a top surface, a bottom surface, a first side and a second side opposite the first side, wherein the first side comprises a first tab and the second side comprises a second tab;
  a second pair of arms, each of the second pair of arms extending from one of the respective first pair of arms in a direction generally opposite the pair of ears, the second pair of arms configured to receive the line therebetween;
  wherein the cover is rotatably adjustable from an open configuration to a closed configuration;
  wherein when the cover is in the closed configuration, the bottom surface of the cover abuts the top surface of the first pair of arms and at least a portion of each tab extends between one of the ears and the top surface of the first pair of arms to maintain the cover in the closed configuration.

2. An apparatus comprising:
an electrical box comprising a plate comprising a notch; and
a trap inserted into the notch so that the trap is coupled to the plate, wherein a line is adapted to be secured to the trap so that the line extends into the electrical box;
wherein the trap comprises:
  a first pair of arms between which the line is adapted to extend;
  a second pair of arms extending from the first pair of arms, respectively, and between which the line is adapted to extend, each arm in the second pair of arms comprising a curved distal end portion that is adapted to engage the line so that the respective curved distal end portions secure the line to the apparatus;
  a base from which the arms in the first pair of arms extend;
  a cover hingedly coupled to the base;
  an open configuration in which the line is permitted to extend between the first pair of arms;
  a closed configuration in which the cover prevents the line from extending between the first pair of arms; and
  a pair of ears extending from the first pair of arms, respectively upward from a surface defined by a top side of the base and the first pair of arms;
wherein the cover comprises a pair of tabs;
wherein, when the apparatus is in the closed configuration, at least a portion of each tab extends between one of the ears and the surface to maintain the apparatus in the closed configuration;
wherein each curved distal end portion curves towards and then away from the other curved distal end portion;
wherein each curved distal end portion comprises at least one tooth extending in a direction towards the other curved distal end portion and away from the first pair of arms;
wherein, when the curved distal end portions engage the line, the teeth resist relative movement between the line and the curved distal end portions in at least one direction;
wherein each arm in the second pair of arms is inwardly biased toward the other arm in the second pair arms when the line extends between the second pair of arms;
wherein each curved distal end portion comprises a slanted transition portion that is adapted to facilitate the insertion of the line between the curved distal end portions in a lateral direction;
wherein each arm in the first pair of arms comprises an angularly-extending portion that extends away from the other arm in the first pair of arms;
wherein each arm in the second pair of arms comprises an angularly-extending portion that extends from the respective angularly-extending portion of the respective arm in the first pair of arms and towards the other arm in the second pair of arms;
wherein the curved distal end portions extend from the respective angularly-extending portions of the arms in the second pair of arms;
wherein each arm in the first pair of arms comprises a channel into which at least a portion of the plate extends; and
wherein each of the arms in the first pair of arms comprises a web adapted to extend into at least a portion of the notch to secure the apparatus to the plate when the apparatus is inserted into the notch.

3. The apparatus of claim 1, wherein each of the second pair of arms is inwardly biased toward the other arm in the second pair arms when the line extends between the second pair of arms.

4. The apparatus of claim 1, wherein each of the pair of ears comprises:
  at least one substantially vertical member extending upward from the top surface of one of the first pair of arms, wherein each substantially vertical member comprises a first end and a second end, the first end of each second substantially vertical member coupled to the top surface;
  a least one substantially horizontal member coupled to the substantially vertical members along the second end of the substantially vertical member the substantially horizontal member extending inward towards a vertical centerline defined by the first and second cavity.

5. The apparatus of claim 1, wherein the cover further comprises:
  a first protrusion extending from a bottom surface of the base adjacent a front side of the base, the front side being disposed between the first side and the second side; and
  a second protrusion extending from the bottom side of the base;
  wherein the first and second protrusions define a slot disposed along the bottom surface of the base, the slot configured to receive a tool therein for adjusting the cover from the closed configuration to the open configuration.

6. The apparatus of claim 1, wherein each tab further comprises a chamfer.

7. The apparatus of claim 6, wherein the cover is integral with and hingedly coupled to the base of the trap.

8. The apparatus of claim 5, wherein the second protrusion comprises a perimeter substantially corresponding to a perimeter of the first cavity.

9. The apparatus of claim 1, further comprising an electrical box comprising a plate comprising a notch, wherein the trap is operable to slidably insert into the notch.

10. An apparatus comprising:
an electrical box comprising a notch;

a trap to which a line is adapted to be secured inserted into the notch, the trap comprising:
  a base;
  a first pair of arms extending from the base and between which a first cavity is defined, the base and the first pair of arms defining a top surface;
  a second pair of arms between which a second cavity is defined, wherein the first cavity and the second cavity define a pathway through which the line is adapted to extend, each of the second pair of arms coupled to and extending generally downward from a respective one of the first pair of arms, each of the second pair of arms comprising a curved distal end portion operable to engage the line so that the respective curved distal end portions secure the line to the apparatus;
  a first ear extending upward from one of the first pair of arms;
  a second ear extending upward from the other of the first pair of arms; and
  a cover comprising a top side, a bottom side and a hinge portion rotatably coupled to the base, wherein the bottom side further comprises a first protrusion having a perimeter substantially corresponding to a perimeter of the first cavity, wherein the cover is rotatable between an open position and a closed position, wherein in the closed position at least a portion of the bottom side of the cover abuts the top surface and a portion of the top side of the cover abuts each of the first and second ears.

* * * * *